United States Patent
AbuAli et al.

(10) Patent No.: US 11,668,847 B2
(45) Date of Patent: Jun. 6, 2023

(54) GENERATING SYNTHETIC GEOLOGICAL FORMATION IMAGES BASED ON ROCK FRAGMENT IMAGES

(71) Applicant: Saudi Arabian Oil Company, Dhahran (SA)

(72) Inventors: Mahdi A. AbuAli, Dhahran (SA); Mokhles Mustapha Mezghani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/516,302

(22) Filed: Nov. 1, 2021

(65) Prior Publication Data

US 2022/0214466 A1    Jul. 7, 2022

Related U.S. Application Data

(60) Provisional application No. 63/133,518, filed on Jan. 4, 2021.

(51) Int. Cl.
*G01V 1/28* (2006.01)
*G01V 1/50* (2006.01)
*G01V 1/30* (2006.01)

(52) U.S. Cl.
CPC .............. *G01V 1/282* (2013.01); *G01V 1/306* (2013.01); *G01V 1/50* (2013.01)

(58) Field of Classification Search
CPC ........... G01V 1/282; G01V 1/306; G01V 1/50
See application file for complete search history.

(56) References Cited

U.S. PATENT DOCUMENTS

| | | | |
|---|---|---|---|
| 2,305,384 A | 12/1942 | Hoover, Jr. | |
| 2,978,673 A | 4/1961 | Richard | |
| 3,014,551 A | 12/1961 | Chapanis | |
| 3,196,385 A | 7/1965 | Smith | |
| 3,281,774 A | 10/1966 | Warren | |
| 3,719,924 A | 3/1973 | Muir et al. | |

(Continued)

FOREIGN PATENT DOCUMENTS

| | | |
|---|---|---|
| CN | 102053270 | 5/2011 |
| CN | 104376556 | 2/2015 |

(Continued)

OTHER PUBLICATIONS

PCT International Search Report and Written Opinion in International Appln. No. PCT/US2022/011159, dated Apr. 14, 2022, 12 pages.

(Continued)

*Primary Examiner* — Mischita L Henson
(74) *Attorney, Agent, or Firm* — Fish & Richardson P.C.

(57) ABSTRACT

In an example method, one or more processors receive a plurality of rock fragment images. Each of the rock fragment images represents respective rock fragments obtained from a subsurface formation during well bore drilling. The one or more processors select one or more portions of the rock fragment images, and generate a geological formation image based on the one or more selected portions of the rock fragment images. The geological formation image is indicative of one or more geological characteristics of the subsurface formation along the well bore.

14 Claims, 7 Drawing Sheets

(56) References Cited

U.S. PATENT DOCUMENTS

| | | |
|---|---|---|
| 4,208,732 A | 6/1980 | Ruehle |
| 4,542,648 A | 9/1985 | Vinegar et al. |
| 4,783,751 A | 11/1988 | Ehrlich |
| 4,868,883 A | 9/1989 | Chen |
| 4,969,129 A | 11/1990 | Currie et al. |
| 5,010,776 A | 4/1991 | Lucero et al. |
| 5,181,171 A | 1/1993 | McCormack et al. |
| 5,191,557 A | 3/1993 | Rector et al. |
| 5,410,252 A | 4/1995 | Potter et al. |
| 5,475,589 A | 12/1995 | Armitage et al. |
| 5,663,499 A | 9/1997 | Semmelbeck et al. |
| 5,844,799 A | 12/1998 | Joseph et al. |
| 5,884,229 A | 3/1999 | Matteucci |
| 6,088,656 A | 7/2000 | Ramakrishnan et al. |
| 6,205,402 B1 | 3/2001 | Lazaar et al. |
| 6,226,596 B1 | 5/2001 | Gao |
| 6,246,963 B1 | 6/2001 | Cross et al. |
| 6,438,493 B1 | 8/2002 | West et al. |
| 6,480,790 B1 | 11/2002 | Calvert |
| 6,574,565 B1 | 6/2003 | Bush |
| 6,754,588 B2 | 6/2004 | Cross et al. |
| 6,775,619 B2 | 8/2004 | Nyland |
| 6,980,940 B1 | 12/2005 | Gurpinar et al. |
| 7,043,367 B2 | 5/2006 | Granjeon |
| 7,337,069 B2 | 2/2008 | Masson et al. |
| 7,363,158 B2 | 4/2008 | Stelting et al. |
| 7,424,367 B2 | 9/2008 | Saltzer et al. |
| 7,925,481 B2 | 4/2011 | Van Wagoner et al. |
| 7,970,545 B2 | 6/2011 | Sanstrom |
| 8,081,796 B2 | 12/2011 | Derzhi et al. |
| 8,170,799 B2 | 5/2012 | Dvorkin et al. |
| 8,184,502 B2 | 5/2012 | Xu et al. |
| 8,219,322 B2 | 7/2012 | Monsen |
| 8,234,923 B2 | 8/2012 | Ramamurthy et al. |
| 8,335,677 B2 | 12/2012 | Yeten et al. |
| 8,380,642 B2 | 2/2013 | Stundner et al. |
| 8,385,604 B2 | 2/2013 | Orpen |
| 8,473,213 B2 | 6/2013 | Zhu et al. |
| 8,476,016 B2 | 7/2013 | Ashby |
| 8,548,785 B2 | 10/2013 | Chugunov et al. |
| 8,583,410 B2 | 11/2013 | Sisk et al. |
| 8,605,951 B2 | 12/2013 | Baggs et al. |
| 8,612,195 B2 | 12/2013 | Sun et al. |
| 8,676,557 B2 | 3/2014 | Ding et al. |
| 8,714,246 B2 | 5/2014 | Pop et al. |
| 8,793,111 B2 | 7/2014 | Tilke et al. |
| 8,838,425 B2 | 9/2014 | Zhang et al. |
| 8,849,623 B2 | 9/2014 | Carvallo et al. |
| 8,938,045 B2 | 1/2015 | Dvorkin et al. |
| 9,043,188 B2 | 5/2015 | Yeten et al. |
| 9,043,189 B2 | 5/2015 | Wallace et al. |
| 9,046,509 B2 | 6/2015 | Dvorkin et al. |
| 9,047,513 B2 | 6/2015 | Derzhi et al. |
| 9,085,957 B2 | 7/2015 | Wallace et al. |
| 9,121,971 B2 | 9/2015 | Thorne |
| 9,201,026 B2 | 12/2015 | Walls et al. |
| 9,262,713 B2 | 2/2016 | Shelley et al. |
| 9,372,943 B2 | 6/2016 | Li et al. |
| 9,612,231 B2 | 4/2017 | Pottorf et al. |
| 9,626,771 B2 | 4/2017 | Mezghani et al. |
| 9,703,006 B2 | 7/2017 | Stern et al. |
| 9,810,062 B2 | 11/2017 | Akkurt et al. |
| 10,295,685 B2 | 5/2019 | Zhang et al. |
| 10,891,462 B2 | 1/2021 | Zhao |
| 10,934,839 B2 | 3/2021 | AbuAli et al. |
| 10,982,537 B2 | 4/2021 | AbuAli et al. |
| 10,983,235 B2 | 4/2021 | Zhang et al. |
| 10,991,078 B2 | 4/2021 | Hakimuddin |
| 11,010,883 B2 | 5/2021 | Anifowose et al. |
| 2002/0042677 A1 | 4/2002 | West |
| 2002/0177955 A1 | 11/2002 | Jalali et al. |
| 2003/0044061 A1 | 3/2003 | Prempraneerach |
| 2003/0110018 A1 | 6/2003 | Dutta et al. |
| 2003/0200030 A1 | 10/2003 | Meldahl |
| 2007/0016389 A1 | 1/2007 | Ozgen |
| 2007/0061079 A1 | 3/2007 | Hu |
| 2007/0133866 A1 | 6/2007 | Chang et al. |
| 2007/0239359 A1 | 10/2007 | Stelting et al. |
| 2008/0175478 A1 | 7/2008 | Wentland et al. |
| 2008/0187219 A1 | 8/2008 | Chen et al. |
| 2009/0014181 A1 | 1/2009 | Vinegar et al. |
| 2009/0164186 A1 | 6/2009 | Haase et al. |
| 2009/0204377 A1 | 8/2009 | Van Wagoner et al. |
| 2009/0259446 A1 | 10/2009 | Zhang et al. |
| 2009/0288881 A1 | 11/2009 | Mullins et al. |
| 2010/0057409 A1 | 3/2010 | Jones et al. |
| 2010/0198638 A1 | 8/2010 | Deffenbaugh et al. |
| 2010/0219334 A1 | 9/2010 | Legrand et al. |
| 2010/0286967 A1 | 11/2010 | Vasilevskiy |
| 2010/0305927 A1 | 12/2010 | Suarez-Rivera et al. |
| 2011/0011595 A1 | 1/2011 | Huang et al. |
| 2011/0048731 A1 | 3/2011 | Imhof et al. |
| 2011/0054869 A1 | 3/2011 | Li et al. |
| 2011/0088895 A1 | 4/2011 | Pop et al. |
| 2011/0103184 A1 | 5/2011 | Westeng et al. |
| 2011/0191080 A1 | 8/2011 | Klie |
| 2011/0218950 A1 | 9/2011 | Mirowski |
| 2011/0251797 A1 | 10/2011 | Leger et al. |
| 2011/0295580 A1 | 12/2011 | Sisk |
| 2012/0150510 A1 | 6/2012 | Safonov et al. |
| 2012/0158389 A1 | 6/2012 | Wu et al. |
| 2012/0221306 A1 | 8/2012 | Hurley et al. |
| 2012/0253770 A1 | 10/2012 | Stern et al. |
| 2012/0261135 A1 | 10/2012 | Nowak et al. |
| 2012/0275658 A1 | 11/2012 | Hurley et al. |
| 2012/0277996 A1 | 11/2012 | Hurley et al. |
| 2012/0281883 A1 | 11/2012 | Hurley et al. |
| 2013/0013209 A1 | 1/2013 | Zhu et al. |
| 2013/0028051 A1 | 1/2013 | Barkved et al. |
| 2013/0064040 A1 | 3/2013 | Imhof et al. |
| 2013/0080133 A1 | 3/2013 | Sung et al. |
| 2013/0092662 A1 | 4/2013 | Fukami et al. |
| 2013/0266039 A1 | 10/2013 | Legrand et al. |
| 2013/0297272 A1 | 11/2013 | Sung et al. |
| 2013/0297273 A1 | 11/2013 | Altundas et al. |
| 2013/0301672 A1 | 11/2013 | Tonina |
| 2013/0304679 A1 | 11/2013 | Fleming |
| 2013/0327125 A1 | 12/2013 | He |
| 2014/0114627 A1 | 4/2014 | Jones et al. |
| 2014/0214387 A1 | 7/2014 | Tilke |
| 2014/0303951 A1 | 10/2014 | Houeto et al. |
| 2014/0378319 A1 | 12/2014 | Regberg et al. |
| 2015/0073715 A1 | 3/2015 | Aarre |
| 2015/0081265 A1 | 3/2015 | Kauerauf et al. |
| 2015/0127261 A1 | 5/2015 | Aldea et al. |
| 2015/0129147 A1 | 5/2015 | Sumnicht et al. |
| 2015/0153476 A1 | 6/2015 | Prange et al. |
| 2015/0233233 A1 | 8/2015 | Rahman |
| 2015/0234863 A1 | 8/2015 | Lilje |
| 2015/0241591 A1 | 8/2015 | Burmester et al. |
| 2015/0293257 A1 | 10/2015 | Liebich et al. |
| 2015/0310294 A1 | 10/2015 | Keskes et al. |
| 2016/0070024 A1 | 3/2016 | Berard et al. |
| 2016/0109593 A1 | 4/2016 | Saxena et al. |
| 2016/0146973 A1 | 5/2016 | Johnson et al. |
| 2016/0161635 A1 | 6/2016 | Ramsay et al. |
| 2016/0169856 A1* | 6/2016 | Sung ............... G01N 33/24 703/10 |
| 2016/0290132 A1 | 10/2016 | Knight et al. |
| 2016/0307312 A1 | 10/2016 | Sungkorn et al. |
| 2016/0313463 A1 | 10/2016 | Wahrmund et al. |
| 2016/0341707 A1 | 11/2016 | Inan |
| 2016/0343150 A1 | 11/2016 | Mezghani et al. |
| 2017/0011149 A1 | 1/2017 | Liu et al. |
| 2017/0091636 A1 | 3/2017 | Polyakov |
| 2017/0091958 A1 | 3/2017 | Mezghani et al. |
| 2017/0205531 A1 | 7/2017 | Berard et al. |
| 2017/0260855 A1 | 9/2017 | Yang et al. |
| 2017/0286802 A1* | 10/2017 | Mezghani ............... G01N 15/08 |
| 2017/0337302 A1 | 11/2017 | Mezghani et al. |
| 2018/0003691 A1 | 1/2018 | N'Guessan et al. |
| 2018/0003841 A1* | 1/2018 | Souche ............... G01V 1/345 |
| 2019/0169986 A1 | 6/2019 | Storm et al. |
| 2019/0179043 A1 | 6/2019 | Qin et al. |

(56) References Cited

U.S. PATENT DOCUMENTS

| | | |
|---|---|---|
| 2019/0271793 A1 | 9/2019 | Wilson et al. |
| 2019/0338637 A1 | 11/2019 | Francois et al. |
| 2019/0353812 A1 | 11/2019 | Zhang et al. |
| 2019/0353813 A1 | 11/2019 | Cobos et al. |
| 2020/0040717 A1 | 2/2020 | Feng et al. |
| 2020/0063532 A1 | 2/2020 | Crouse et al. |
| 2020/0225177 A1 | 7/2020 | Sungkorn et al. |
| 2021/0246784 A1 | 8/2021 | AbuAli et al. |

FOREIGN PATENT DOCUMENTS

| | | | | |
|---|---|---|---|---|
| CN | 104823202 A | * | 8/2015 | ........... G01N 23/046 |
| CN | 104914465 | | 9/2015 | |
| CN | 105247546 | | 1/2016 | |
| CN | 107356958 | | 11/2017 | |
| EP | 2772775 | | 9/2014 | |
| WO | WO 0229445 | | 4/2002 | |
| WO | WO 2005119303 | | 12/2005 | |
| WO | WO 2008048697 | | 4/2008 | |
| WO | WO 2009139949 | | 11/2009 | |
| WO | WO 2012118866 | | 9/2012 | |
| WO | WO 2012118868 | | 9/2012 | |
| WO | WO 2013071185 | | 5/2013 | |
| WO | WO 2013092662 | | 6/2013 | |
| WO | WO 2013092663 | | 6/2013 | |
| WO | WO 2013149126 | | 10/2013 | |
| WO | WO 2015127349 | | 8/2015 | |
| WO | WO 2016012826 | | 1/2016 | |
| WO | WO 2017011658 | | 1/2017 | |
| WO | WO-2017019718 A1 | * | 2/2017 | ............ E21B 25/00 |
| WO | WO 2017172935 | | 10/2017 | |
| WO | WO 2018208634 | | 11/2018 | |
| WO | WO 2019222129 | | 11/2019 | |

OTHER PUBLICATIONS

U.S. Appl. No. 13/695,226, filed Apr. 22, 2011, Imhof et al.

Abouelresh, "Quantitative and Qualitative Evaluation of Micro-Porosity in Qusaiba Hot Shale, Saudi Arabia", 3rd Unconventional Resomces Technology Conference, Jul. 2015, 10 pages.

Abu-Ali et al., "Paleozoic petroleum systems of Saudi Arabia: a basin modeling approach," Geo Arabia, vol. 10, No. 3, published 2005; pp. 131-168.

Al Ibrahim and Mustafa, "Multi-scale sequence stratigraphy, cyclostratigraphy, and depositional environment of carbonate mudrocks in the Tuwaiq Mountain and Hanifa formations, Saudi Arabia," Diss. Colorado School of Mines, Arthur Lakes Library, 2014, 208 pages.

Alakeely et al., "Application of Artificial Intelligence for Fluid Typing using Calibrated Compositional Data", 11th Middle East Geosciences Conference and Exhibition (GEO 2014), Mar. 2014, 25 pages.

Al-Bazzaz and Al-Mehanna, "Porosity, Permeability, MHR Calculations Using SEM and Thin-section Images for Characterizing Complex Mauddud-Burgan Carbonate Reservoir," Paper SPE-110730-MS, Society of Petroleum Engineers (SPE), presented at the Asia Pacific Oil and Gas Conference and Exhibition, Oct. 30-Nov. 1, 2007, 10 pages.

AiQattan et al., "Moving models into reality: an automated workflow to calibrate forward stratigraphic modeling; application to Hanifa and Arab-D in Central Saudi Arabia," presented at the Abu Dhabi International Petroleum Exhibition & Conference, Nov. 13-16, 2017; Society of Petroleum Engineers, 2017, 11 pages.

Anselmetti et al., "Quantitative characterization of carbonate pore systems by digital image analysis," AAPG Bulletin, vol. 82, No. 10, Oct. 1998, 22 pages.

Asmussen et al., "Semi-automatic Segmentation of Petrographic This Section Images using a "Seeded-Region Growing Algorithm" with an Application to Characterize Wheathered Subarkose Sandstone," Computers & Geosciences, 83:C, Oct. 2015, 11 pages.

Assous et al., "Microresistivity borehole image inpainting," Geophysics vol. 79 No. 2, Mar.-Apr. 2014, 9 pages.

Barraud, "The use of watershed segmentation and GIS software for textural analysis of thin sections," Journal of Volcanology and Geothermal Research, 154, Jun. 1, 2006, 17 pages.

Barton et al., "Interactive image analysis of borehole televiewer data. Automated pattern analysis in petroleum exploration," Springer New York, 1992; pp. 223-248.

Bartozzi et al., "Automated Grain Boundary Detection and Classification in Orientation Contrast Images," Journal of Structural Geology, 2000, 1569-1579.

Beda et al., "An Innovative Approach for Estimating the Sw and Porosity Using Gas and Mud Logging Data in Real Time", AAPG International Conference and Exhibition, Oct. 31, 2011, 17 pages.

Beda et al., "Gas While Drilling (GWD); A Real Time Geologic And Reservoir Interpretation Tool", SPWLA 40th Annual Logging Symposium, 1999, 14 pages.

Benedet et al., "A morphological modeling study to compare different methods of wave climate schematization and evaluate strategies to reduce erosion losses from a beach nourishment project," Coastal Engineering, 112, Jun. 2016, 18 pages.

Benedet et al., "Optimization of nearshore dredge pit design to reduce impacts on adjacent beaches," Journal of Coastal Research 29:3, May 2013, 8 pages.

Bennetzen et al., "Automatic High-Throughput Detection of Fluid Inclusions in Thin-Section Images using a Novel Algorithm," Paper IPTC-17680 presented at the International Petroleum Technology Conference, Jan. 19-22, 2014, 11 pages.

Berrezueta et al. "Qualitative and quantitative changes in detrital reservoir rocks caused by $CO_2$ —brine—rock interactions during first injection phases (Utrillas sanstones, northern Spain)," Solid Earth 7, Jan. 2016, 17 pages.

Blair and Berryman, "Estimation of Permeability and Relative Permeability for Sandstone using Image Analysis of Cross Sections" Rock Mechanics as a Multidisciplinary Science, Roegiers (ed.), Mar. 1991, 12 pages.

Bornholdt et al., "Experiments in Stratigraphy: Recent Advances in Stratigraphic and Sedimentologic Computer Simulators—Inverse stratigraphic modeling using genetic algorithms," SEPM Publication, Society of Sedimentary Geology, 62, Jan. 1, 1999, 6 pages.

Bornholdt et al., "Inverse Stratigraphic Modeling Using Genetic Algorithms: Introduction," Society for Sedimentary Geology (SEPM), Jan. 1, 1999, 1 page.

Brown and Davies, "Methods for medium-term prediction of the net sediment transport by waves and currents in complex coastal regions," Continental Shelf Research, Jun. 29, 2009, 13 pages.

Buscombe, "Estimation of Grain-Size Distributions and Associated Parameters from Digital Images of Sediment," Sedimentary Geology, Jan. 10, 2008.

Caeiro et al., "Geostatistical Modeling of Complex Deltaic Reservoirs Integrating Production Data through Optimized History Matching," SPE 177813, Abu Dhabi International Petroleum Exhibition and Conference, Nov. 12, 2015, Abu Dhabi, UAE; 14 pages.

Cantrell et al., "New tools and approaches in carbonate reservoir quality prediction: a case history from the Shu'aiba Formation, Saudi Arabia," The Geological Society of London, Special Publications, Sep. 29, 2014, 25 pages.

Cazanacli et al., "Deltaic Network Growth and Stratigraphy through a Rule Based Geometric Model," AAPG 2015, Annual Convention and Exhibition, May 31-Jun. 3, 2015, 48 pages.

Chai et al., "Automatic discrimination of sedimentary facies and lithologies in reef-bank reservoirs using borehole image logs," Applied Geophysics, Mar. 2009, vol. 6, No. 1; pp. 17-29.

Chatzirodou et al., "Investigation of deep sea shelf sandbank dynamics driven by highly energetic tidal flows," Marine Geology, 380, Oct. 1, 2016, 19 pages.

Choh and Milliken, "Virtual Carbonate Thin Section using PDF: New Method for Interactive Visualization and Archiving," Carbonates and Evaporites, 19:2, Dec. 2004, 6 pages.

Choudhary and Mukeiji, "Generation of Multiple History Matched Models Using Optimization Technique," 25th Annual SCRF Meeting, 2012, 61 pages.

(56) References Cited

OTHER PUBLICATIONS

Choudhury et al., "Automated Grain Boundary Detection by CASRG," Journal of Structural Geology, Mar. 1, 2006, 28:3 (363-375).

Couprie et al., "Quasi-linear algorithms for the topological watershed," Journal of Mathematical Imagining and Vision, 22:2-3 (231-249), 2005.

Couprie et al., "Topological Gray-Scale Watershed Transform," in Proceedings of SPIE Vision Geometry V, 3168:136-146, 1997.

Cross and Lessenger, "Construction and application of a stratigraphic inverse model," SEPM Special Publications, 62, Jan. 1, 1999, 15 pages.

cydarex.fr [online], "Cydarex: DarcyLog and DarcyPress," available on or before Feb. 28, 2021, via Internet Archive: Wayback Machine URL <http://web.archive.org/web/20210228224638/http://www.cydarex.fr/?page_id=33>, retrieved on Feb. 3, 2022, URL <http://www.cydarex.fr/7page_id=33>.

Das, "Morphology-Based Image Processing, In: Guide to Signals and Patterns in Image Processing: Foundations," Methods and Applications, Springer, Apr. 23, 2015, pp. 269-298, Abstract only, 3 pages.

Dashti et al., "Use of Mud Gas Chromatograph for Reservoir Quality Prediction While Drilling—A Case Study", SPE Kuwait Oil and Gas Show and Conference, 2015, 17 pages.

De Bruin and Bouanga, "Time attributes of Stratigraphic Surfaces, analyzed in the structural and Wheeler transformed domain," EAGE 69th Conference and Exhibition, Jun. 11-14, 2007, 5 pages.

Denney et al., "Improved and more-rapid history matching with a nonlinear proxy and global optimization," SPE 101933, SPE Annual Technical Conference and Exhibition, vol. 2, Sep. 24, 2006, San Antonio, TX; pp. 728-740.

Devasto et al., "Using image Analysis and Arcgis to Improve Automatic Grain Boundary Detection and Quantify Geological Images," Computers and Geosciences, 49, Dec. 2012, 8 pages.

Dey, "Fluvial Hydrodynamics," GeoPlanet: Earth and Planetary Science, 2014, 706 pages.

DMT; "DMT CoreScan 3 High-Tech Core Logging Tool"; http://www.corescan.de/fileadmin/downloads/DMT_CoreScan3_Info.pdf; Jan. 31, 2013; pp. 1-20.

Duan et al., "Similarity measure of sedimentary successions and its applications in inverse stratigraphic modeling," Petroleum Science, Jul. 2017, 14(3): 484-492.

Erzinger et al., "Real-time mud gas logging during drilling of the SAFOD Pilot Hole in Parkfield, CA", Geophysical Research Letters, Jun. 24, 2004, 31, 4 pages.

Fontana et al., "Past, Present and Future Advancements in Methods for Detecting Hydrocarbon Seepage after 75 Years," copyright 2014, 49 pages.

Francus, "An Image-Analysis Technique to Measure Grain-Size Variation in Thin Sections of Soft Clastic Sediments," Sedimentary Geology 121, Nov. 1998, 10 pages.

Fueten, "A Computer-Controlled Rotating Polarizer Stage for the Petrographic Microscope," Computers & Geosciences, 23:2 (203-208), Mar. 1, 1997.

Gaillot et al.; "Contribution of Borehole Digital Imagery in Core-Logic-Seismic Integration"; Scientific Drilling, No. 5; Sep. 2007; pp. 50-53.

Giboli et al., "Reverse time migration surface offset gathers part 1: a new method to produce classical common image gathers," SEG Technical Program Expanded Abstracts 2012, Sep. 1, 2012, 6 pages.

Gibson et al. "Apparent layering in common midpoint stacked images of two dimensionally heterogeneous targets," Geophysics vol. 55, Issue 11, Nov. 1990, 12 pages.

Gibson, "Analysis of lateral coherence in wide angle seismic images of heterogeneous targets," Journal of Geophysical Research, vol. 96, Jun. 10, 1991, 13 pages.

Goins and Reedy, "Digital Image Analysis in Microscopy for Objects and Architectural Conservation," Objects Specialty Group Postprints, 7, Jun. 12, 2000, 16 pages.

Goldberg, "Genetic Algorithms in Search, Optimization, and Machine Learning," Addison-Wesley Longman Publishing Co., Inc., Boston, MA, published 1989; Chapter 1, pp. 1-25.

Goodchild and Fueten, "Edge Detection in Petrographic Images Using The Rotating Polarizer Stage," Computers and Geosciences, 24:8, Oct. 1998, 7 pages.

Goodchild, "Geological Image Processing of Petrographic Thin Sections using the Rotating Polarizer Stage," A thesis submitted to the Department of Earth Sciences in partial fulfillment of the requirements for the degree of Master of Science, Brock University, St. Catharines, Ontario, Sep. 1998, 166 pages.

Goovearts, "Chapter 8: Assessment for Spatial Uncertainty," in Geostatistics for natural resources evaluation, Oxford University Press, Jan. 1997, 7 pages.

Graham et al., "Automated Sizing of Coarse-Grained Sediments: Image-Processing Procedmes," Mathematical Geology, 37:1, Jan. 2005, 28 pages.

Granjeon and Joseph, "Concepts and applications of a 3D multiple lithology, diffusive model in stratigraphic modeling," Numerical Experiments in Stratigraphy: Recent Advances in Stratigraphic and Sedimentological Computer Simulations, 62, SEPM Special Publication, Jan. 1999, 15 pages.

Granjeon, "Modelisation stratigraphique deterministe: conception et applications d'un modele diffusif 3D multilithologique," Doctoral Thesis, Universit of Rennes 1, 1996, 216 pages.

Griffiths et al., "Sedsim in hydrocarbon exploration," Geologic Modeling and Simulation, Kluwer Academic, Jan. 2001, 27 pages.

Grove and Jerram, "jPOR: An ImageJ Macro to Quantify Total Optical Porosity From Blue-Stained Thin Sections," Computers & Geosciences, 37, Nov. 2011, 10 pages.

Guo et al., "Image Detection Method of Drill Cuttings," Journal of Geophysics and Engineering, 0, Jan. 9, 2019.

Hammerschmidt et al., "Real-time drilling mud gas monitoring for qualitative evaluation of hydrocarbon gas composition during deep sea drilling in the Nankai Trough Kumano Basin", Geochemical Transactions, 2014, 15 pages.

Harbaugh and Carter, "Chapter 1: Introduction, Chapter 2: Models and Simulation" in Computer Simulation in Geology, 99 edition, Wiley, Jan. 15, 1970, 62 pages.

Haworth et al., "Interpretation of Hydrocarbon Shows Using Light (C1-C5) Hydrocarbon Gases from Mud-Log Data", The American Association of Petroleum Geologists Bulletin, Aug. 1985, 69:8 (1305-1310).

Heilbronner, "Automatic Grain Boundary Detection and Grain Size Analysis Using Polarization Micrographs or Orientation Images," Journal of Structural Geology, 2000, 969-981.

Hoogendoom et al., "Storms: Process-response modelling of fluvio-deltaic stratigraphy," Computers and Geosciences 34:10, Oct. 2008, 23 pages.

Hoogendoom, "The impact of changes in sediment supply and sea-level on fluvio-deltaic stratigraphy," PhD., Dissertation, Delft University of Technology, Jan. 31, 2006, 176 pages.

Hoshen and Kopelman, "Percolation and cluster distribution, I. cluster multiple labeling technique and critical concentration algorithm," Physical Review Board, vol. 14, No. 8, Oct. 15, 1976, 8 pages.

Hossain, "Relative Permeability Prediction from Image Analysis of Thin Sections," SPE-143606, Society of Petroleum Engineers (SPE), presented at the SPE EUROPEC/EAGE Annual Conference and Exhibition, May 23-26, 2011, 10 pages.

Huang et al., "Numerical forward modelling of 'fluxoturbidite' flume experiments using SEDSIM," Marine and Petroleum Geology vol. 35, Aug. 2012, 11 pages.

Huang et al., "Recent development in stratigraphic forward modelling and its application in petroleum exploration," Australian Journal of Earth Sciences, vol. 62, Issue 8, Jan. 2016, 18 pages.

Hurley et al., "Method to Generate Fullbore Images Using Borehole Images and Multi-point Statistics," SPE 120671, SPE Middle East Oil and Gas Show and Conference, Society of Petroleum Engineers, Mar. 15-18, 2009, 18 pages.

(56) References Cited

OTHER PUBLICATIONS

Hurst et al., "Predicting Reservoir Characteristics From Drilling and Hydrocarbon-Gas Data Using Advanced Computational Mathematics", 2009 SPE Offshore Europe Oil & Gas Conference & Exhibition, Sep. 2009, 10 pages.

Hussain et al., "Moving Models into Reality: An Automated Workflow to Calibrate Forward Strati graphic Modeling; Application to Hani fa and Arab-D in Central Saudi Arabia", SPE-188920-MS, Society of Petroleum Engineers (SPE), Abu Dhabi International Petroleum Exhibition & Conference, Jan. 1, 2017, 11 pages.

Hutton and Syvitski, "Advances in the numerical modeling of sediment failure during the development of a continental margin," Marine Geology, 203:3-4, Jan. 2004, 14 pages.

Hutton and Syvitski, "Sedflux 2.0: An advanced process-response model that generates three-dimensional stratigraphy," Computer and Geoscience 34:10, Oct. 2008, 19 pages.

Igleias et al., "Automatic recognition of hematite grains under polarized reflected light microscopy through image analysis," Minerals Engineering, Pergamon Press: Oxford, GB, 24:12 (1264-1270), Apr. 12, 2011.

Izadi et al., "An intelligent system for mineral identification in thin sections based on a cascade approach," Computers and Geoscience, 99, Feb. 2017, 13 pages.

Karssenberg et al., "Conditioning a Process-based Model of Sedimentary Architecture to Well Data," Journal of Sedimentary Research, 71:6, Nov. 2001, 12 pages.

Kendall et al., "The simulation of the sedimentary fill of basins," Journal of Geophysical Research, 96:B4, Apr. 10, 1991, 19 pages.

Krige, "A Statistical Approach to Some Mine Valuation and Allied Problems on the Witwatersrand," thesis submitted for degree of Master of Science in Engineering at the University of Witwatersrand, Mar. 15, 1951, 62 pages.

Kubo et al., "Advance and application of the stratigraphic simulation model 2D-SedFlux: From tank experiment to geological scale simulation," Sedimentary Geology, 178:3-4, Jul. 15, 2005 9 pages.

Kubo et al., "Inverse modeling of post Last Glacial Maximum transgressive sedimentation using 2D-SedFlux: Application to the northern Adriatic Sea," Marine Geology, vol. 234, Issues 1-4, Dec. 18, 2006, 11 pages.

Kursun, "Particle Size and Shape Characteristics of Kemerburgaz Quartz Sands Obtained by Sieving, Laser Diffraction, and Digital Image Processing Methods," Mineral Processing and Extractive Metallurgy Review, 30:4, Oct. 2009, 2 pages, Abstract only.

Laigle et al., "A workflow integrating seismic interpretation and stratigraphic modelling—application to the NPRA Basin," EAGE Research Workshop: From Seismic Interpretation to Stratigraphic and Basin Modelling—Present and Future, Grenoble, Sep. 2006, 6 pages.

Lascelles et al., "Appling Subsurface DNA Sequencing in Wolfcamp Shales, Midland Basin," SPE-184869-MS, Society of Petroleum Engineers (SPE), presented at the SPE Hydraulic Fracturing Technology Conference and Exhibition, the Woodlands, Texas, Jan. 24-26, 2017, 16 pages.

Layman, "Porosity Characterization Utilizing Petrographic Image Analysis: Implications For Identifying and Ranking Reservoir Flow Units, Happy Spraberry Field, Garza County, Texas," Thesis Submitted to the Office of Graduate Studies of Texas A&M University in partial fulfillment of the requirements of the degree of Master Of Science, May 2002, 114 pages.

Leitao et al., "A Multiscale Method for the Reassembly of Two-Dimensional Fragmented Objects," IEEE Transactions on Pattern Analysis and Machine Intelligence, 24:9, Sep. 2002, 13 pages.

Lerat et al., "Construction of a Stochastic Geological Model Constrained by High-Resolution 3D seismic data—Application to the Girassol field, offshore Angola," SPE Annual Technical Conference and Exhibition, vol. 4, No. 110422, Nov. 11, 2007, 16 pages.

Lerche, "An inverse method for determining parameters for folded structures," Quarterly of applied mathematics, 54, Dec. 1996, 11 pages.

Lessenger, "Forward and Inverse Simulation Models of Stratal Architecture and Facies Distributions in Marine Shelf Coastal Plain Environments," PhD Thesis, Colorado School of Mines, 1993, 197 pages.

Li et al., "GIS-based detection of grain boundaries," Journal of Structural Geology, Pergamon Press, 30:4 (431-443), Dec. 27, 2007.

Li et al., "Mixed integer simulation optimization for optimal hydraulic fracturing and production of shale gas fields," Journal of Engineering Optimization, vol. 48, Issue 8, 2016.

Liang et al., "A reduced-complexity model for river delta formation—Part 1: Modeling deltas with channel dynamics," Earth Surface Dynamics 3, Jan. 28, 2015, 20 pages.

Liang et al., "A reduced-complexity model for river delta formation—Part 2: Assessment of the flow routing scheme," Earth Surface Dynamics, vol. 3, Jan. 28, 2015, 18 pages.

Lorenzo-Trueba et al., "A geometric model for the dynamics of a fluvially dominated deltaic system under base-level change," Computers and Geosciences 53, Apr. 2013, 9 pages.

MacQueen, "Some Methods for classification and Analysis of Multivariate Observations," proceedings of 5th Berkeley Symposium on Mathematical Statistics and Probability, 1, Jun. 21-Jul. 18, 1965, published by Berkeley, California, University of California Press, 1967, 17 pages.

Marschallinger and Hofmann, "The Application of Object Based Image Analysis to Petrographic Micrographs," Microscopy: Science, Technology, Applications and Education, A. Mendez-Vilas and J. Diaz (Eds.), FORMATEX, Dec. 2010, 7 pages.

Matthews, "Importance of Sampling Design and Density in Target Recognition," AAPG Memoir 66, pp. 243-253, 1996.

Melo, "Formation fluid prediction through gas while drilling analysis relationship between mud gas data and downhole fluid samples," Thesis to obtain Master of Science Degree in Petroleum Engineering, Tecnico Lisboa, Feb. 2016, 89 pages.

Mitchum, "Seismic stratigraphy and global changes of sea level: part 6, Stratigraphic interpretations of seismic reflection patters in depositional sequences, Section 2. Application of seismic reflection configuration of stratigraphic interpretation," American Association of Petroleum Geologists, Jan. 1977, 17 pages.

Monsen et al., "Quantitative 3D Outcrop Interpretation" SEG Technical Program Expanded Abstracts, 2006, 5 pages.

Morehead et al., "Modeling the temporal variability in the flux of sediment from ungauged river basins," Global and Planetary Change, 39:1-2, Oct. 2003, 16 pages.

Nicolas et al., "Forward Stratigraphic Modelling, Deterministic Approach to Improve Carbonate Heterogeneity Prediction; Lower Cretaceous, Abu Dhabi," International Petroleum Exhibition and Conference, Nov. 9-12, 2015, 16 pages.

Nordlund, "Formalizing geological knowledge with an example of modeling stratigraphy using fuzzy logic," Journal of Sedimentary Research 66:4, Jul. 1, 1996, 10 pages.

Nordlund, "FUZZIM: forward stratigraphic modeling made simple," Computers and Geosciences, 25:4, May 1999, 8 pages.

Obamawhitehouse.archives.gov (online), "Fact Sheet: Announcing the National Microbiome Initiative," released on May 13, 2016, retrieved from URL <https://obamawhitehouse.archives.gov/the-press-office/2016/05/12/fact-sheet-announcing-national-microbiome-initiative>, retrieved on Feb. 8, 2021, 4 pages.

Obara et al., "Utilisation of the Image Analysis Method for the Detection of the Morphological Anisotropy of Calcite Grains in Marble," Computer Geoscience, 2007, 7 pages.

Obara, "An Image Processing Algorithm for the Reversed Transformation of Rotated Microscope Images," Computers & Geosciences, 853-859, 2007.

opendtect.org [online], "Open Seismic Repository," available on or before Dec. 7, 2017, [retrieved on Jun. 11, 2018], retrieved from URL: <http://opendtect.org/osr/>, 2 pages.

Overeem et al., "Three-dimensional numerical modeling of deltas," SEPM Special Issue, 83, River Deltas: concepts, models and examples, Jan. 2005, 19 pages.

Paulsen et al.; "A Simple Method for Orienting Drill Core by Correlating Features in Whole-Core Scans and Oriented Borehole-Wall Imagery"; Journal of Structural Geology; Published in 2002; pp. 1233-1238.

(56) References Cited

OTHER PUBLICATIONS

Percak-Dennett et al., "High Resolution Dynamic Drainage Height Estimations using Subsurface DNA Diagnostics," SPE-195266-MS, Society of Petroleum Engineers (SPE), presented at the SPE Western Regional Meeting, San Jose, California, Apr. 23-26, 2019, 7 pages.

Perring et al., "Using Automated Digital Image Analysis to Provide Quantitative Petrographic Data on Olivine-Phyric Basalts," Computers & Geosciences, 30, Mar. 2004, 13 pages.

Pirmez et al., "Clinoform development by advection-diffusion of suspended sediment: Modeling and comparsion to natural systems," Journal of Geophysical Research, 103:24, Oct. 10, 1998, 18 pages.

Poplavskii et al., "Two-dimensional inverse modeling of sedimentary basin subsidence," Journal of Geophysical Research, 106:B4, Apr. 10, 2001, 15 pages.

PTTC Technology Connections, "Surface Hydrocarbon Detection Shows Promise," Published on or before Feb. 1999, 2 pages.

Qayyum et al., "A modem approach to build 3D sequence stratigraphic framework," Oil and Gas Journal 111, Oct. 2013, 16 pages.

Rafidah et al., "A review of stratigraphic simulation techniques and their applications in sequence stratigraphy and basin analysis," Bulletin of the Geological Society of Malaysia, 54, Nov. 2008, 11 pages.

Rasheed et al., "Application of geo-microbial prospecting method for finding oil and gas reservoirs," Frontier Earth Science, 2014, 11 pages.

Rasheed et al., "Bacteria as indicators for finding oil and gas reservoirs: A case study of the Bikaner-Nagaur Basin, Rajasthan, India," Pet. Sci., 2011, 8:264-268, 5 pages.

Reedy and Kamboj, "Image Analysis Protocol Instructions #1: Spatial Calibration of Images, Project Report," University of Delaware, Laboratory of Analysis of Cultural Materials, 2004, 9 pages.

Reedy et al., "Image Analysis in Quantitative Particle Studies of Archaeological Ceramic Thin Sections," Advances in Archaeological Practice, 2:4, Nov. 2014, 17 pages.

Reedy, "Review of Digital Image Analysis of Petrographic Thin Sections in Conservation Research," Journal of the American institute for Conservation, 45:2, Jun. 2006, 8 pages.

Remy et al., "Geostatistics: a recall of concepts," in Applied geostatistics with SGeMS: A user's guide, Cambridge University Press, Jul. 2009, 5 pages.

Richa et al., "Image Analysis and Pattern Recognition for Porosity Estimation from Thin Sections," SEG Technical Program Expanded Abstracts, Jan. 2006, 5 pages.

Rijks et al. "Attribute extraction: an important application in any detailed 3-D interpretation study," Geophysics: The Leading Edge of Exploration, Sep. 1991, 9 pages.

Ritchie et al., "Three-dimensional numerical modeling of deltaic depositional sequences 1: Influence of the rate and magnitude of sea-level change," Journal of Sedimentary Research, vol. 74, Issue 2, Mar. 1, 2004, 18 pages.

Ritchie et al., "Three-dimensional numerical modeling of deltaic depositional sequences 2: Influence of the rate and magnitude of sea-level change," Journal of Sedimentary Research, 74:2, Mar. 1, 2004, 18 pages.

Roksandic et al., "Seismic Facies Analysis Concepts," Geophysical Prospecting, vol. 26, No. 2, Jun. 1, 1978, 16 pages.

Rostami et al., "Developing a Committee Machine Model for Predicting Reservoir Porosity from Image Analysis of Thin Sections," proceedings of the 20th Formation Evaluation Symposium of Japan, Oct. 1-2, 2014, 11 pages.

Ruzyla, "Characterization of Pore Space by Quantitative Image Analysis," SPE Formation Evaluation, Aug. 1986, 10 pages.

Sacchi et al., "Towards process-based geological reservoir modelling: Obtaining basin-scale constraints from seismic and well data," Marine and Petroleum Geology 61, Mar. 2015, 13 pages.

Saharan et al., "Reassembly of 2D Fragments in Image Reconstruction," International Journal of Computer Applications, 0975-8887, 19-5, Apr. 2011, 5 pages.

Saidian et al., "Qualitative and Quantitative Reservoir Bitumen Characterization: A Core to Log Correlation Methodology", 2014-SSSS SPWLA Conference Paper, 16 pages.

Schepers et al., "Optimized Reservoir History Matching Simulation of Canyon Formation, SACROC Unit, Permian Basin," Topical Report, Department of Energy, Nov. 9, 2007; 79 pages.

Schumacher, D. and M. A. Abrams, eds., 1996, "Hydrocarbon Migration and Its Near-Surface Expression," AAPG Memoir, 66, pp. 445.

Seleznev et al., "Formation properties derived from a multi-frequency dielectric measurement," SPWLA 47th Annual Logging Symposium, Jun. 4-7, 2006, 12 pages.

Seybold et al., "Modeling river delta formation," proceeding of the National Academy of the United States of America, vol. 104, Issue 43, Oct. 23, 2007, 6 pages.

Sharma and Sharma, "Image Segmentation Using Morphological Operation for Automatic Region Growing," International Journal of Innovative Research in Computer and Communication Engineering, 2:9, Sep. 2014, 7 pages.

Sharma, "Quantitative stratigraphic inversion," Dissertation for degree of Doctor of Philosophy in Geosciences, Virginia Polytechnic Institute and State University, Dec. 6, 2006, 105 pages.

Sheppard et al., "Techniques for image enhancement and segmentation of tomographic images of porous materials," Physica A: Statistical Mechanics and its Applications, vol. 339, No. 1-2, Aug. 1, 2004, 7 pages.

Singh et al., "Facies Classification Based on Seismic Waveform—A Case Study from Mumbai High North," 2004, 5th Conference & Exposition on Petroleum Geophysics, Hyderabad—2004, India, pp. 456-462.

Sivanandam et al., "Introduction to Genetic Algorithms," Springer-Verlag Berlin Heidelberg, published 2008; Chapter 2, pp. 15-36.

Slupik, et al., "The stratigraphy of the Neogene-Quaternary succession in the southwest Netherlands from the Schelphoek borehole (42G4-11/42G0022)—a sequence-stratigraphic approach. Netherlands," Journal of Geosciences 86:4, Dec. 2007, 16 pages.

Smith and Beermann, "Image Analysis of Plagioclase Crystals in Rock Thin Sections using Grey Level Homogeneity Recognition of Discrete Areas," Computers & Geosciences 33, Mar. 2007, 22 pages.

Stagars et al., "Microbial Community Response to Simulated Petroleum Seepage in Caspian Sea Sediments," Frontiers in Microbiology, Apr. 2017, 8:764, 16 pages.

Starkey et al., "A Microcomputer-Based System for Quantitative Petrographic Analysis," Computers & Geosciences, 20:9 (1285-1296), 1994.

Šťastná et al., "Cathodoluminescence Microscopy and Petrographic Image Analysis of Aggregates in Concrete Pavements Affected by Alkali-Silica Reaction," Materials Characterization, 65, Mar. 2012, 11 pages.

Syvitski and Hutton, "2D SEDFLUX 1.0C: an advanced process-response numerical model for the fill of marine sedimentary basins," Computer and Geosciences 27:6, Jul. 2001, 23 pages.

Syvitski and Hutton, "Failure of Marine Deposits and their Redistribution by Sediment Gravity Flows," Pure and Applied Geophysics, 160:10-11, Oct. 2003, 17 pages.

Syvitski et al., "HydroTrend: a climate-driven hydrological transport model for predicting discharge and sediment to lakes or oceans," Computer Geoscience, vol. 24, Issue 1, Jan. 29, 1998, 18 pages.

Tarantola et al., "Inverse Problem Theory and Methods for Model Parameter Estimation," Society for the Industrial and Applied Mathematics (SIAM), published 2005; Chapter 3, pp. 57-80.

Tarquini et al., "A Microscopic Information System (MIS) for Petrographic Analysis," Computers and Geosciences, 36:5 (665-674), May 1, 2010.

Teagle et al.; "Methods" Proceedings of the Integrated Ocean Drilling Program, vol. 309/312; Published in 2006; pp. 1-70.

Tetzlaff, "Input uncertainty and conditioning in siliciclastic process modelling, Geological Prior Information: Informing Science and Engineering," Geological Society, London, Special Publications, vol. 239, Jan. 2004, 15 pages.

(56) References Cited

OTHER PUBLICATIONS

Thomas et al.; "Rock Physics and Formation Evaluation: Automated Lithology Extraction from Core Photographs" First Break, vol. 29; Jun. 1, 2011; pp. 103-109.
Tissot et al., "Petroleum Formation and Occurrence," Springer-Verlag Berlin Heidelberg, published 1984, 2nd edition; Chapter 26, pp. 1-33.
Van Der Meer et al., "Hyperspectral Hydrocarbon Microseepage Detection and Monitoring: Potentials and Limitations," published in 2000, 9 pages.
Van Laarhoven et al., "Simulated Annealing: Theory and Applications," Mathematics and Its Applications (Book 37), Springer Netherlands, 1987 edition; Chapters 1-2, pp. 1-15.
Vanorio et al., "How mecrite content affects and the transport, seismic and reactive properties of carbonate rocks: Implications for 4D seismic," SEG International Exposition and Annual Meeting, Houston, Oct. 25-30, 2009, 5 pages.
Vinther et al., "3-D seismic texture classification," Presented at the European 3-D Reservoir Modelling Conference, Society of Petroleum Engineers, Apr. 16-17, 1996, 7 pages.
Vossler, "Automatic delineation of lateral facies changes in clastic environments," presented at the 59th Annual International meeting, Society of Exploration Geophysicists, paper SI 5.4, Oct. 29-Nov. 2, 1989, 2 pages.
Wardaya et al., "Integrating Digital Image Processing and Artificial Neural Network for Estimating Porosity from Thin Section," Paper IPTC-16959, presented at the International Petroleum Technology Conference, Mar. 26-28, 2013, 10 pages.
Weger et al., "Quantification of pore structure and its effect on sonic velocity and permeability in carbonates," AAPG Bulletin, vol. 93, No. 10, Oct. 2009, 21 pages.
WellCAD Software, "4.4 Book 1—Basics," V2011.10.17, ALT, Oct. 17, 2011, 11 pages.
Weltje et al., "Stratigraphic inversion of siliciclastic basin fills: a note on the distinction between supply signals resulting from tectonic and climatic forcing," Basin Research, vol. 10, Jun. 28, 1998, 25 pages.
Wijns et al., "Interactive inverse methodology applied to stratigraphic forward modelling," Geological Prior Information: Informing Science and Engineering, Geological Society, London, Special Publications 239, 2004, 9 pages.
Wijns et al., "Inverse modelling in geology by interactive evolutionary computation," Journal of Structural Geology, 25, Jan. 9, 2003, 11 pages.
Wikipedia.com [online], "Artificial neural network," available on or before May 2020, retrieved on May 10, 2020, retrieved from URL: <https://en.wikipedia.org/w/index.php?title=Artificial neuralnetwork &oldid=955889246>, 27 pages.
Wilkens et al.; "Data Report: Digital Core Images as Data: An Example from IODP Expedition 303"; Proceedings of the Integrated Ocean Drilling Program, vol. 303/306; Published in 2009; pp. 1-16.
Yang et al., "A machine learning approach to predict gas oil ratio based on advanced mud gas data," SPE 195459, Society of Petroleum Engineers, Jan. 2019, 17 pages.
Yin et al., "A hierarchical streamline-assisted history matching approach with global and local parameter updates," Journal of Petroleum Science and Engineering, vol. 80, No. 1, Dec. 2011; pp. 116-130.
Yin et al., "FMI image based rock structure classification using classifier combination," Neural Computing and Applications, 2011, vol. 20, No. 7; pp. 955-963.
Zehui et al., "Permeability prediction with artificial neural network modeling in the venture gas field, offshore eastern Canada," Geophysics, Mar. 1996, 61(2):422-436, 16 pages.
Zeljkovic et al., "An algorithm for petro-graphic colour image segmentation used for oil exploration," High Performance Computing and Simulation (HPCS), 2011 International Conference on IEEE, Jul. 4, 2011, 6 pages.
Zhang et al., "A statistical information reconstruction method of images based on multiple-point geostatistics integrating soft data with hard data," presented in the ISCSCT'08 International Symposium, Computer Science and Technology vol. 1, Dec. 2008, 6 pages.
Zhang et al., "Characterizing Stratigraphic Traps Using Improved Waveform Classification Seismic Facies Analysis: An Example from Central Saudi Arabia," Dec. 2016, First Break vol. 34, pp. 77-84.
Zhang et al., "Evolutionary Computation and Its Applications in Neural and Fuzzy Systems," Applied Computational Intelligence and Soft Computing, vol. 2011, No. 7, Jan. 2011; 20 pages.
Zhang et al., "Porous media reconstruction using a cross-section image and multiple-point geostatistics," presented at the ICACC'09 International Conference, Advanced Computer Control, Feb. 2009, 6 pages.
Zhao et al., "Estimating permeability of shale-gas reservoirs from porosity and rock compositions", GEOPHYSICS, 83:5, 2018, 12 pages.
Zhou et al., "Segmentation of Petrographic Images by Integrating Edge Detection and Region Growing," Computers & Geosciences, Copyright 2004, pp. 817-831.
Zhou et al., "Segmentation of petrographic images by integrating edge detection and region growing," Computers and Geosciences, Pergamon Press, vol. 30, No. 8, Oct. 1, 2004, 15 pages.

\* cited by examiner

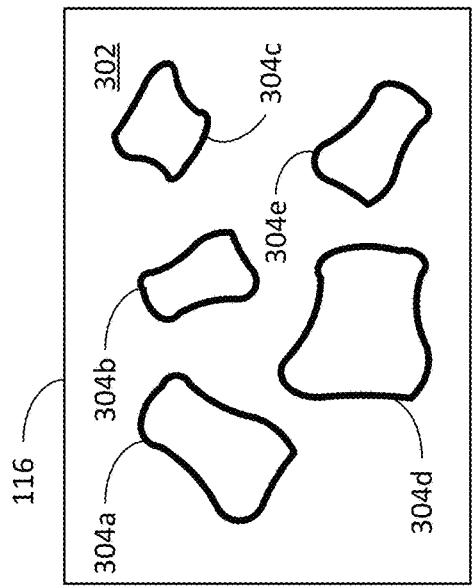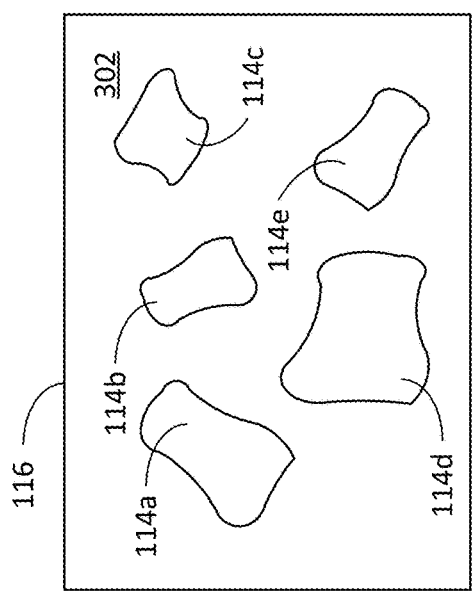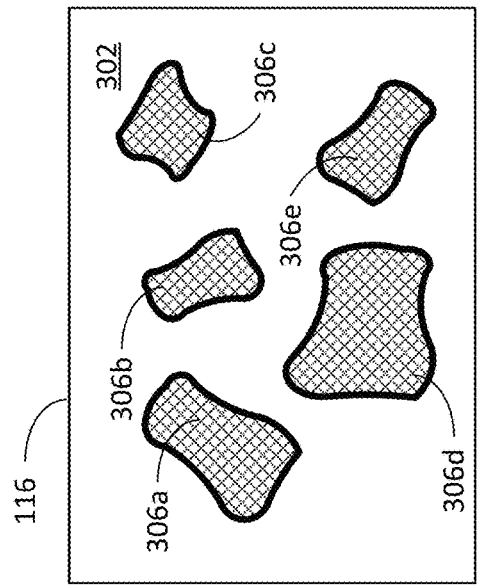

GENERATING SYNTHETIC GEOLOGICAL FORMATION IMAGES BASED ON ROCK FRAGMENT IMAGES

CLAIM OF PRIORITY

This application claims priority to U.S. Provisional Application Ser. No. 63/133,518, filed on Jan. 4, 2021, the entire contents of which is hereby incorporated by reference.

TECHNICAL FIELD

The disclosure relates to systems and techniques for generating synthetic geological formation images.

BACKGROUND

During well bore drilling, portions of a subsurface formation are excavated from the well bore to the surface of the earth. These excavated portions can be used to evaluate the characteristics of the subsurface formation along the well bore. For example, the excavated portions can be used to estimate the porosity, permeability, fractures, and depositional environments of the subsurface formation along the well bore.

SUMMARY

This disclosure describes systems and techniques for generating synthetic geological formation images based on rock fragment images. As an example, a computerized image synthesis system can obtain several rock fragment images, each representing respective rock fragments that were obtained from a subsurface formation during the drilling of a well bore. The image synthesis system can select one or more portions of the rock fragment images, and based on the selected portions, generate a synthetic geological formation image representing the geological characteristics of the subsurface formation along the well bore. In some implementations, the synthetic geological formation image can approximate, emulate, mimic, resemble, or otherwise be similar to an image of a continuous core sample taken from the subsurface formation.

The implementations described in this disclosure can provide various technical benefits. For instance, an image synthesis system can enable systems and users to evaluate the characteristics of a subsurface formation along the length of a well bore in an accurate manner, without requiring that a continuous core sample be extracted intact from the subsurface formation. As extracting a continuous core sample may be time consuming and may require an expenditure of resources that might otherwise not be expended to drill a well bore, the image synthesis system can reduce the time and effort needed to conduct a drilling operation. Further, the image synthesis can enable systems and users to better evaluate the characteristics of a subsurface formation, such that efforts can be focused on well bores having characteristics that are more favorable for the extraction of valuable resources (for example, oil or natural gas).

In an aspect, a method includes receiving, by one or more processors, a plurality of rock fragment images, where each of the rock fragment images represents respective rock fragments obtained from a subsurface formation during well bore drilling; selecting, by the one or more processors, one or more portions of the rock fragment images; and generating, by the one or more processors, a geological formation image based on the one or more selected portions of the rock fragment images, where the geological formation image is indicative of one or more geological characteristics of the subsurface formation along the well bore.

Implementations of this aspect can include one or more of the following features.

In some implementations, the one or more geological characteristics of the subsurface formation along the well bore can include at least one of a porosity of the subsurface formation along the well bore or a permeability of the subsurface formation along the well bore.

In some implementations, the plurality of rock fragment images can represent rock fragments obtained from the subsurface formation at a plurality of depths along the well bore. The geological formation image can be indicative of the one or more geological characteristics of the subsurface formation at each of the depths along the well bore.

In some implementations, the plurality of rock fragment images can represent rock fragments obtained from the subsurface formation at a plurality of first depths along the well bore. The geological formation image can be indicative of the one or more geological characteristics of the subsurface formation at each of the first depths and at each of a plurality of second depths along the well bore. The first depths can be different from the second depths.

In some implementations, selecting the one or more selected portions of the rock fragment images can include, for each of the rock fragment images, segmenting the rock fragment image into a plurality of image segments. Each of the image segments can correspond to a different respective rock grain in the rock fragment image.

In some implementations, segmenting the rock fragment image can include identifying one or more edges in the rock fragment image.

In some implementations, segmenting the rock fragment image can include identifying one or more contiguous regions in the rock fragment image.

In some implementations, the rock fragment image can be segmented based on a watershed transformation.

In some implementations, selecting the one or more portions of the rock fragment images can include, for each of the rock fragment images: identifying the image segment corresponding to the rock gain having a largest area among the rock gains in the rock fragment image, and selecting the identified image segment as one of the one or more portions of the rock fragment images.

In some implementations, generating the geological formation image can include combining the one more selected portions of the rock fragment images into the geological formation image.

In some implementations, combining the one or more selected portions of the first rock fragment images into the second geological formation image can include arranging the one more selected portions of the first rock fragment images sequentially along a first dimension in the geological formation image.

In some implementations, each of the one or more selected portions of the first rock fragment images can be associated with a respective depth, and the one more selected portions of the first rock fragment images can be arranged sequentially in the geological formation image according to depth.

In some implementations, the geological formation image can include multiple instances of at least one of the one or more selected portions of the rock fragment images.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

BRIEF DESCRIPTION OF DRAWINGS

FIGS. 3A-3C are diagrams of an example process for selecting portions of a rock fragment image for use in synthesizing a geological formation image.

DETAILED DESCRIPTION

Figure 1:
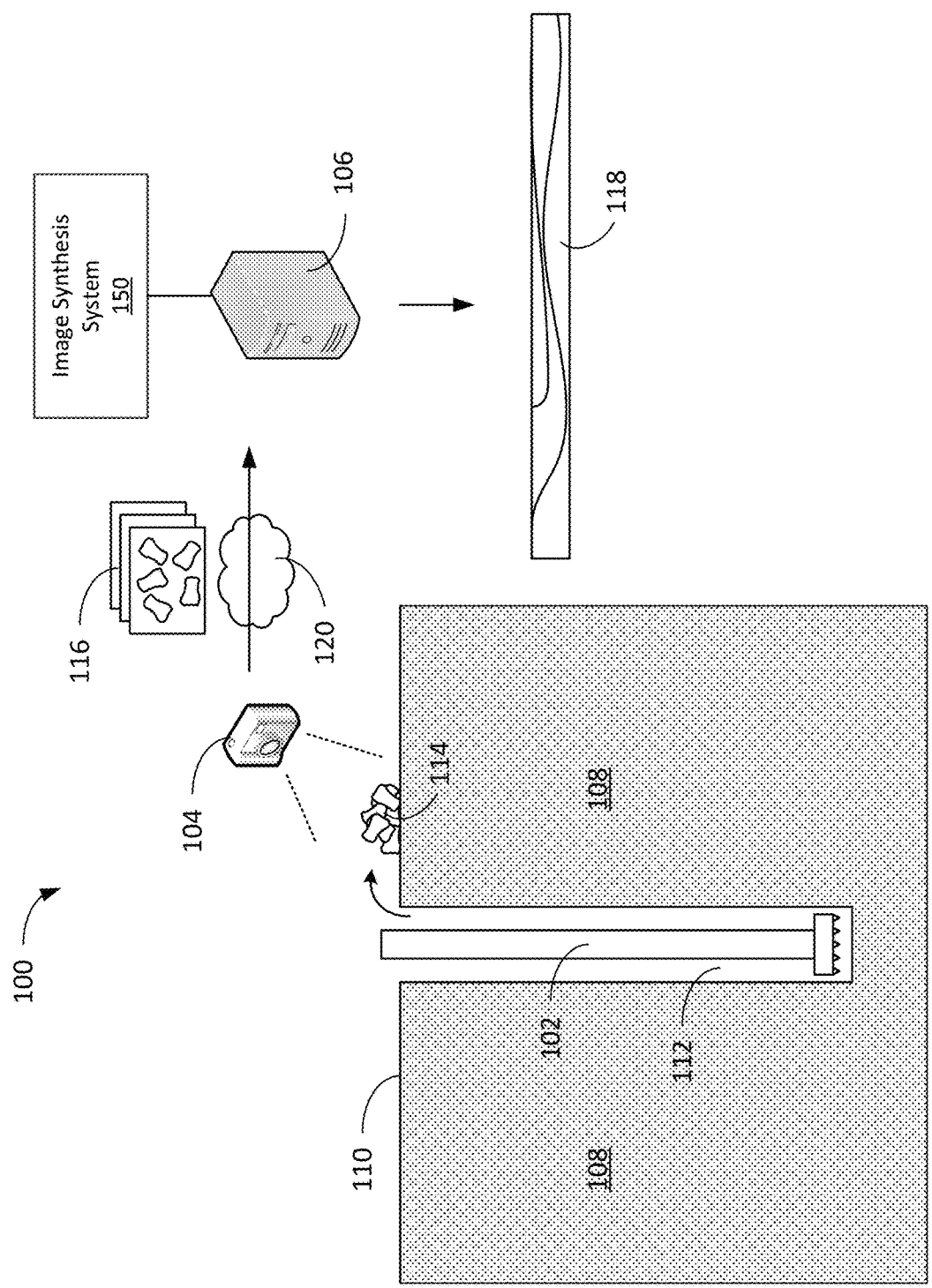
FIG. 1 is a diagram of an example system for generating synthetic geological formation images.

An example system 100 for generating synthetic geological formation images is shown in FIG. 1. The system 100 includes drilling equipment 102, an image capture system 104, and a computer system 106. An image synthesis system 150 is maintained on the computer system 106.

The drilling equipment 102 is configured to drill a well bore 112 through a subsurface formation 108, and to excavate material from the subsurface formation 108 to a surface of the earth 110. For example, the drilling equipment 102 can include one more drills and drill bits configured to cut through the subsurface formation 108 along the well bore 112, and to extract fragments 114 of the subsurface formation 108 along the well bore 112 to the surface of the earth 110. In some implementations, the fragments 114 can include one or more pieces of rock that were produced during the drilling processing. In some cases, the fragments 114 may be referred to as "rock fragments" or "rock cuttings."

The image capture system 104 is configured to obtain images 116 of the fragments 114 that were extracted from the subsurface formation 108. As an example, the fragments 114 can be arranged on the surface of the earth 110 (or on another suitable surface, such as a bench top), and the image capture system 104 can capture one or more images of the fragments 114. In some implementations, the image capture system 104 can include one or more still cameras, for example to capture one or more still images of the fragments 114. In some implementations, the image capture system 104 can include one or more video cameras, for example, to capture one or more videos or sequences of images of the fragments 114.

In some implementations, each of the images 116 can be associated with a particular depth or range of depths beneath the surface of the earth 110. For example, during a drilling process, the fragments 114 that are excavated may be associated with progressively lower depths beneath the surface of the earth 110. Accordingly, the images 116 of those fragments 114 can be associated with the depths or ranges or depths from which the fragments 114 were obtained.

The images 116 are transmitted via a network 120 to the computer system 106 and the image synthesis system 150 for processing. The network 120 can be any communications network through which data can be transferred and shared. For example, the network 120 can be a local area network (LAN) or a wide-area network (WAN), such as the Internet. The network 120 can be implemented using various networking interfaces, for instance wireless networking interfaces (such as Wi-Fi, Bluetooth, or infrared) or wired networking interfaces (such as Ethernet or serial connection). The network 120 also can include combinations of more than one network, and can be implemented using one or more networking interfaces.

The image synthesis system 150 receives the images 116 via the network 120, and selects one or more portions of the images 116 (for example, portions corresponding to one or more of the fragments 114, or one or more portions thereof). Based on the selected portions, the image synthesis system 150 generates a synthetic geological formation image 118 representing the geological characteristics of the subsurface formation 108 along the well bore 112.

In some implementations, the synthetic geological formation image 118 can approximate, emulate, mimic, resemble, or otherwise be similar to an image of a continuous core sample taken from the subsurface formation 108. For instance, the synthetic geological formation image 118 can include a visual approximation of the subsurface formation 108 along the well bore 112, had it not been fragmented into several fragments 114 by the drilling equipment 102. For example, the dimensions of the synthetic geological formation image 118 can be the same as or can approximate the dimensions of the well bore 112 along a vertical cross section. As another example, the synthetic geological formation image 118 can include a visual representation of a continuous and uninterrupted extent of rock or other material, either along a portion of or the entirety of the synthetic geological formation image 118.

In some implementations, the synthetic geological formation image 118 can be processed to determine information regarding the subsurface formation 108. For example, the synthetic geological formation can provide a visual approximation of the subsurface formation 108 along the length of the well bore 112. As another example, the synthetic geological formation image 118 can be indicative of properties of the subsurface formation 108 along the length of the well bore 112. Example properties include the porosity, permeability, fractures, and depositional environments of the subsurface formation 108.

As described above, the image synthesis system 150 is maintained on the computer system 106. The computer system 106 can be any electronic device (or electronic devices) that is used to view, process, transmit, and/or receive data. Example computer systems 106 include desktop computers, notebook computers, server systems, and mobile computing devices (such as cellular phones, smartphones, tablets, personal data assistants, notebook computers with networking capability). The computer system 106 can include devices that operate using one or more operating system (as examples, Microsoft Windows, Apple macOS, Linux, Unix, Google Android, and Apple iOS,) and/or architectures (as examples, x86, PowerPC, and ARM).

Although the computer system 106 is illustrated as a respective single device in FIG. 1, in practice, the computer system 106 can be implemented using one or more devices (for example, each device including at least one processor such as a microprocessor or microcontroller). A computer system 106 can be, for instance, a single computing device, and the image synthesis system 150 can be maintained and operated on the single computing device. In some implementations, the computer system 106 can include multiple computing devices that are connected to a network (for example, the network 120, or some other network), and the image synthesis system 150 can be maintained and operated on some or all of the computing devices. For instance, the computer system 106 can include several computing devices, and the image synthesis system 150 be distributive on one or more of these computing devices (for example, as a part of a "cloud" computing environment).

Figure 2:
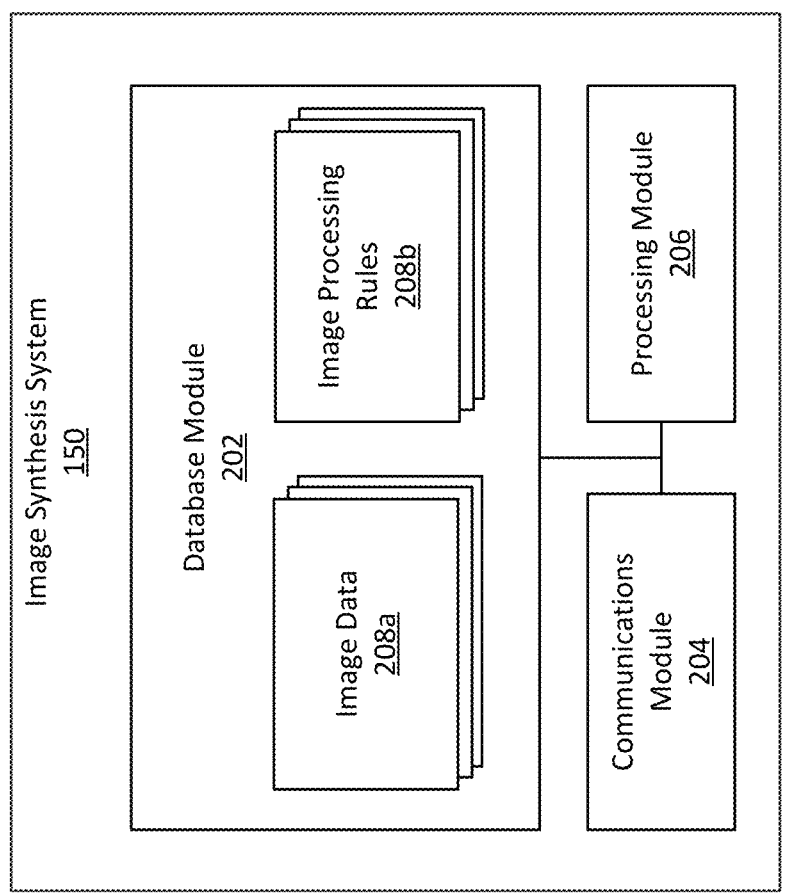
FIG. 2 is a diagram of an example image synthesis system.

FIG. 2 shows various aspects of the image synthesis system 150. The image synthesis system 150 includes several modules that perform particular functions related to the operation of the system 100. For example, the image synthesis system 150 can include a database module 202, a communications module 204, and a processing module 206.

The database module 202 maintains information related to generating synthetic geological formation images.

The database module 202 can store image data 208a received by or generated by the system 100. For example, the database module 202 can store one or more of the images 116 received from the image capture system 104. As another example, the database module 202 can store one or more synthetic geological formation images 118 generated by the image synthesis system 150. As another example the database module 202 can store one or more images of core samples obtained from one or more subsurface formations (for example, continuous core sample that were extracted intact from subsurface formations).

Further, the database module 202 can store information regarding each of the images. For example, the database module 202 can store an indication of the depth or ranges of depths associated with each of the images 116. As another example, the database module 202 can store an indication of the particular well bore that is associated with each of the images 116. As another example, the database module 20 can store an indication of the particular well bore that is associated with each of the images of the core samples.

The database module 202 can also store data records of one or more image processing rules 208b for processing the images 116 and generating the synthetic geological formation images 118.

As an example, the image processing rules 208b can specify how one or more portions the images 116 are selected for use in generating synthetic geological formation images 118. For instance, the image processing rules 208b can specify that portions of the images 116 having certain characteristics be selected over portions of images 116 having other characteristics.

In some implementations, the image processing rules 208b can specify that each of the images 116 be segmented into different image segments, and that one or more of the image segments be selected for use in generating synthetic geological formation images 118.

A simplified example of an image segmentation and selection process is shown in FIGS. 3A-3C.

In this example, an image 116 depicts several fragments 114a-114e overlaid on a background 302 (for example, as shown in FIG. 3A). The image processing rules 208b can specify that the image 116 be processed in a particular manner to identify the fragments 114a-114e depicted in the image 116.

In some implementations, the image processing rules 208b can specify that this be performed, at least in part, by identifying one or more edges in the image 116. For example, as shown in FIG. 3B, the image 116 can be processed such that the edges 304a-304e of the fragments 114a-114e, respectively, are detected within the image 116. The portions 306a-306e of the image 116 that enclosed by the edges 304a-304e, respectively (for example, as shown in FIG. 3C), can be identified as candidate image segments for selection. In some implementations, the image processing rules 208b can specify that edge detection be performed according to a particular technique, such as using a Canny edge detector or an image threshold technique.

In some implementations, portions 306a-306e can be identified using a watershed transformation. A watershed transformation a mathematical transformation defined on a grayscale image. The name refers metaphorically to a geological watershed, or drainage divide, which separates adjacent drainage basins. The watershed transformation treats the image it operates upon like a topographic map, with the brightness of each point representing its height, and finds the lines that run along the tops of ridges. Different image segments can be identified by identifying regions of the image in which water would metaphorically settle.

For example, in some implementations, a transformation function W is a watershed of a function F if and only if W≤F and W preserves the contrast between the regional minima of F, where the contrast between two regional minima M1 and M2 is defined as the minimal "altitude" (for example, image identity) that is climbed when going from M1 to M2. In some implementations, local minima of the gradient of the image 116 can be chosen as markers (for example, to produce an over-segmentation), and multiple image segments can be subsequently merged together. In some implementations, a marker-based watershed transformation can make use of specific marker positions that have been either explicitly defined (for example, by a user) or determined automatically with morphological operators or using other techniques.

Further, the image processing rules 208b can specify how one or more images segments of the images 116 are selected for use in over others for use in generating a synthetic geological formation image 118. As an example, in some implementations, the image processing rules 208b can specify that the image segment having the largest area among the image segments in an image be selected (for example, corresponding to the rock fragment having the largest continuous "grain" in the image). The area of an image segment can be calculated, for example, by counting the number of pixels that are included in the image segment (for example, the number of pixels that are enclosed by a detected edge). For instance, in the example shown in FIG. 3C, the portion 306d has the largest area from among the portions 306a-306e. Accordingly, the portion 306d can be selected over the other portions 306a-306c and 306e.

Further, the image processing rules 208b can specify how the synthetic geological formation images 118 are generated based on the selected portions of the images 116. For instance, the image processing rules 208b can specify that the selected portions of the images 116 be arranged according to particular orientation in a synthetic geological formation image 118. Further, the image processing rules 208b can specify that the selected portions of the images 116 have a particular dimensions or be scaled to a particular degree in a synthetic geological formation image 118. Further, the image processing rules 208b can specify that the selected portions of the images 116 be spatially arranged in a particular manner relative to one another in a synthetic geological formation image 118.

As described above, each of the images 116 can be associated with a particular depth or range of depths beneath the surface of the earth 110. For example, the fragments 114 depicted in a particular image 116 may have been obtained from a particular depth during operation of the drilling equipment 102, and thus may be indicative of the characteristics of the subsurface formation 108 at or around that depth. Accordingly, in the synthetic geological formation image 118, the selected portions of the images 116 can be arranged relative one another in ascending or descending order according to their respective depths. This can be beneficial, for example, as it enables a system or a user to determine the characteristics of the subsurface formation 108 along a continuous and/or monotonic range of depths that spans the depths of each of the images 116 used to generate the synthetic geological formation image 118.

Figure 4A:
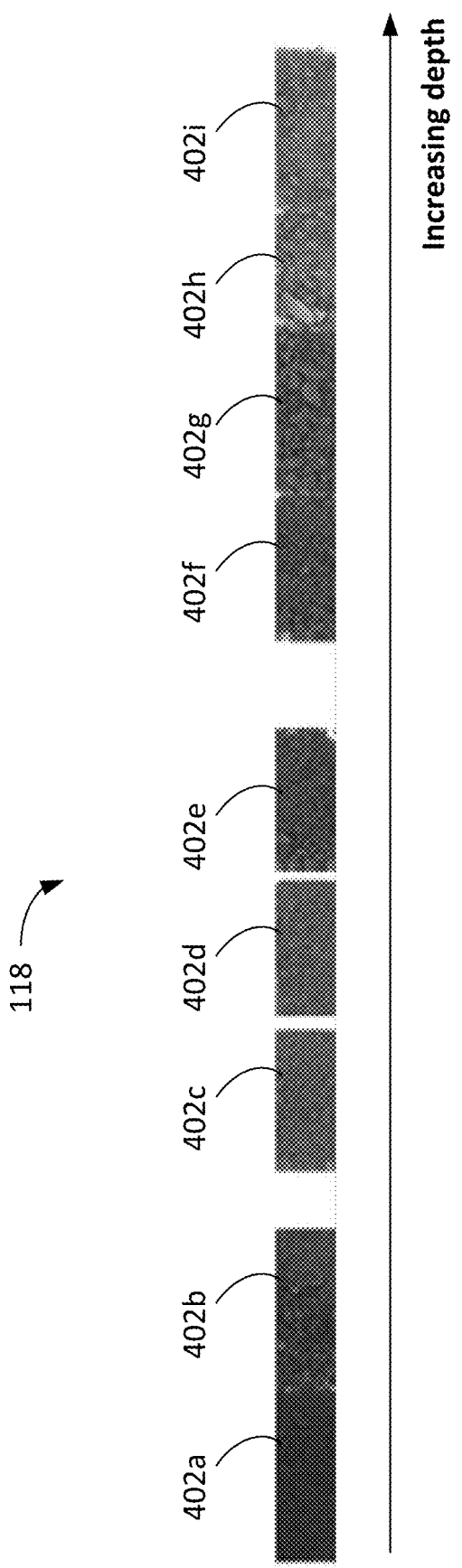
FIG. 4A is a diagram of an example synthetic geological formation image.

To illustrate, FIG. 4A shows an example synthetic geological formation image 118 generated using one or more of the techniques described herein. In this example, the synthetic geological formation image 118 includes several portions 402a-402h (for example, selected from respective images 116 of fragments 114 obtained from different depths beneath the surface of the earth 110). The portions 402a-402i are arranged in a sequence, in order of increasing depth (for example, from left to right).

In some implementations, the image processing rules 208b can specify that a synthetic geological formation image 118 be generated by positioning two or more of the selection portions of the images 116 end-to-end, such that there are no gaps between adjacent portions. For instance, in the example shown in FIG. 4A, the portions 402f-402i are positioned end-to-end, such that there are no gaps between them.

In some implementations, the image processing rules 208b can specify that a synthetic geological formation image 118 be generated by positioning two or more of the selection portions of the images 116 such that there are gaps between adjacent portions. For instance, in the example shown in FIG. 4A, the portions 402b and 402c are positioned such that there is a gap between them (for example, a void region with no visual information is between them).

In some implementations, the image processing rules 208b can specify that a synthetic geological formation image 118 be generated by positioning selected portions of the images 116 according to regular or periodic intervals. As an example, the image processing rules 208b can specify that the selected portions of the images 116 be positioned sequentially in order of depth, and in increments of 10 feet in depth. For instance, the first selected portion can represent the characteristics of the subsurface formation 108 at a depth of 10 feet, the second selected portion can represent the characteristics of the subsurface formation 108 at a depth of 20 feet, the third selected portion can represent the characteristics of the subsurface formation 108 at a depth of 30 feet, and so on.

In some implementations, the image processing rules 208b can specify that one or more portions of the synthetic geological formation image 118 be extrapolated or interpolated based on the selected portions of the images 116. For instance, in some implementations, the synthetic geological formation image 118 can include multiple instances of a particular selected portion of the image 116. The selected portion of the image 116 can correspond to a particular depth beneath the surface of the earth 110, and can be used to represent the subsurface formation 108 at and around that particular depth. As an example, a portion of an image can correspond to a depth of 100 feet beneath the surface of the earth 110. The image processing rules 208b can specify that the synthetic geological formation image include multiple instances of that portion of the image to represent a range of depths around 100 feet (for example, 90 feet to 110 feet).

Referring back to FIG. 2, the communications module 204 allows for the transmission of data to and from the image synthesis system 150. For example, the communications module 204 can be communicatively connected to the network 120, such that it can receive data the image capture system 104. Information received from the image capture system 104 can be processed (for example, using the processing module 206) and stored (for example, using the database module 202).

Further, information from the image synthesis system 150 (for example, information stored on the database module 202) can be transmitted to the other systems or devices through the communications module 204. For example, the communications module 204 can transmit the synthetic geological formation images 118 generated by the image synthesis system 150 to one or more other computer systems for review or further processing.

The processing module 206 processes data stored or otherwise accessible to the image synthesis system 150. For instance, the processing module 206 can receive one or more images 116 (for example, stored as image data 208a), and process the images 116 based on the image processing rules 208b to generate one or more synthetic geological formation images 118. As an example, as described above, the processing module 206 can select one or more portions the images 116 based on the image processing rules 208b. Further, based on the image processing rules 208b, the processing module 206 can generate one or more synthetic geological formation images 118 using the selected portions, such as by arranging the selected portions occurring to particular orientations, scaling the dimensions of the selections portions to a particular degree, and spatially arranging the selected portions relative to one another in a particular manner.

In some implementations, the image synthesis system 150 can be calibrated or "trained" based on actual core samples that have been taken from the subsurface formation. For example, a continuous core sample can be extracted intact from subsurface formation (for example, a core sample that extends along a range of depths beneath the surface of the earth 110), and one or more images of the core sample can be obtained by the image capture system 104. Further, portions of or all of the core sample can be fragmented into several fragments, and fragments from particular depths or ranges of depths can be grouped together. The image capture system 104 can obtain images of each of the groups of fragments (for example, in a similar manner as described with respect to FIG. 1). These images can be used to generate one or more synthetic geological formation images 118, as described above.

Figure 4B:
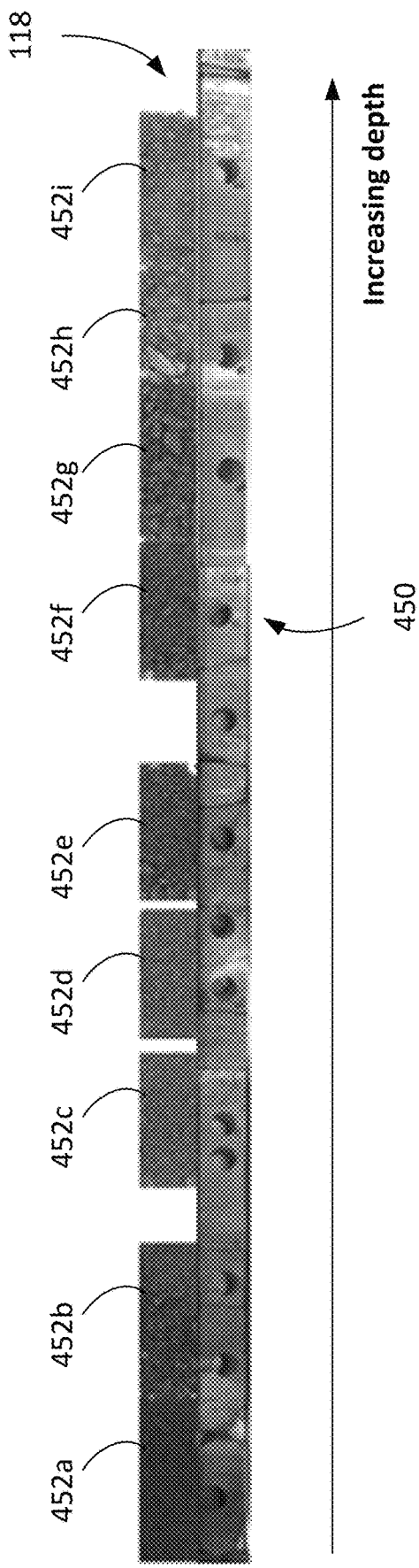
FIG. 4B is a diagram of an example synthetic geological formation image and an example image of a core sample.

To illustrate, FIG. 4B shows an example image 450 of a core sample extracted from a subsurface formation 108. As shown in the image 450, a number of plugs (for example, small circular sections of the core sample) have been removed from core sample along its length (for example, corresponding to different depths beneath the surface of the earth 110). These plugs can be crushed (for example, using a press, hammer, chisel, or some other tool), such that they resemble or mimic rock cuttings that might be obtained while drilling a well bore in the subsurface formation 108.

In a similar manner as describe above, image of the crushed plugs can be obtained using the image capture system 104, and a synthetic geological formation image 118 can be generated using one or more of the techniques described herein. In this example, the synthetic geological formation image 118 includes several portions 452a-452h (for example, selected from respective images of the crushed plugs obtained from different depths along the core sample). The portions 452a-452i are arranged in a sequence, in order of increasing depth (for example, from left to right).

The image synthesis system 150 can compare the images of the core sample (for example, the image 450) to the synthetic geological formation images 118. Based on this comparison, the image synthesis system 150 can modify one or more of the image processing rules 208b, such that the synthetic geological formation images 118 generated based on the images of the fragments (in accordance with the image processing rules 208b) would more similar to the images of the core sample. In some implementations, this process can be performed using images of core samples and synthetic geological formation images (for example, generated using images of crushed plugs taken from the core samples) for multiple different well bores to calibrate or train the image synthesis system 150. For example, these images can be used as a "training" data set that shows known relationships between core samples and their corresponding rock cuttings.

After calibration or training, the image synthesis system 150 can be used to generate synthetic geological formation images 118 based on images of fragments obtained from other well bores. In some implementations, the calibration or training process can be performed iteratively over time (for example, using additional sets of training data), such that operation of the image synthesis system 150 is continuously improved.

Example Processes

Figure 5:
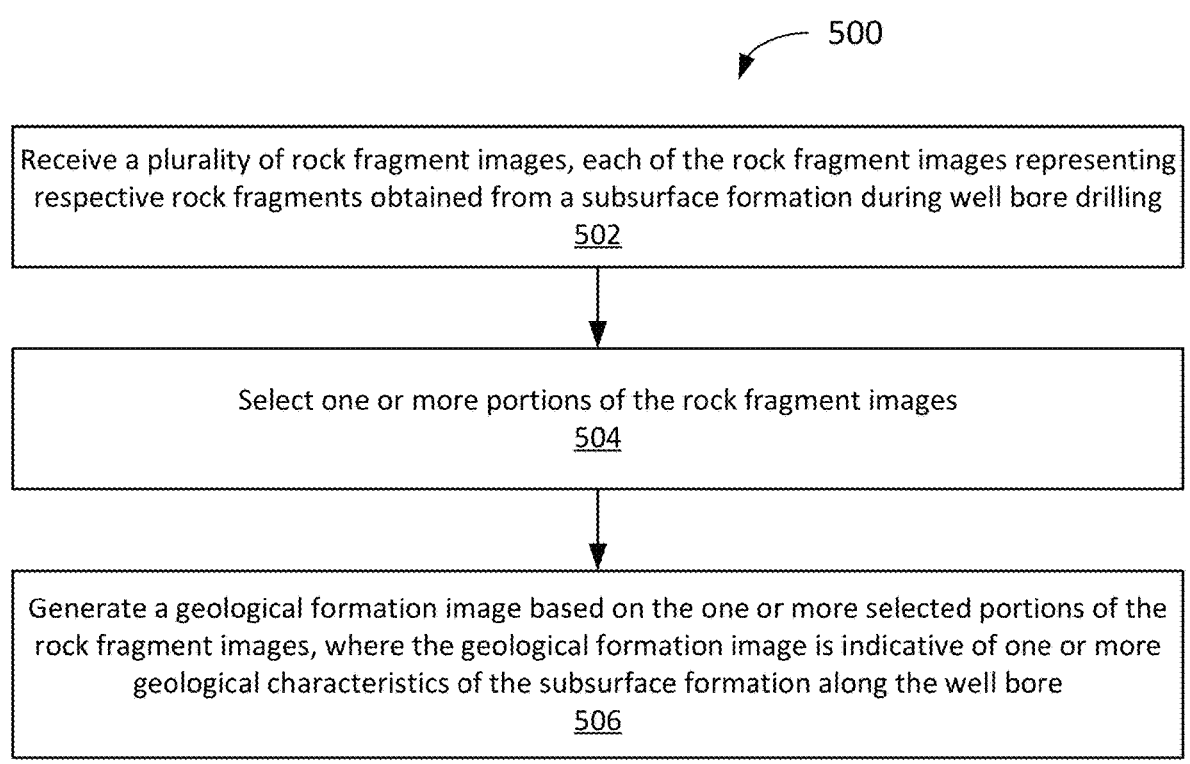
FIG. 5 is flow chart diagram of an example process for generating a synthetic geological formation image.

An example process 500 for generating a synthetic geological formation image is shown in FIG. 5. In some implementations, the process 500 can be performed by the image synthesis systems described in this disclosure (for example, the image synthesis system 150 shown and described with respect to FIGS. 1 and 2) using one or more processors (for example, the processors 610 shown in FIG. 6).

In the process 500, one or more processors receiver a plurality of rock fragment images (block 502). Each of the rock fragment images represents respective rock fragments obtained from a subsurface formation during well bore drilling. As an example, referring to FIG. 1, an image capture system 104 can capture images 116 of fragments 114 (for example, rock fragments or rock cuttings) obtained from the subsurface formation 108 during a drilling operation using the drilling equipment 102.

The one or more processors select one or more portions of the rock fragment images (block 504).

In some implementations, selecting the one or more selected portions of the rock fragment images can include, for each of the rock fragment images, segmenting the rock fragment image into a plurality of image segments. Each of the image segments can correspond to a different respective rock grain in the rock fragment image.

In some implementations, segmenting the rock fragment image can include identifying one or more edges in the rock fragment image. In some implementations, segmenting the rock fragment image can include identifying one or more contiguous regions in the rock fragment image. In some implementations, the rock fragment image can be segmented based on a watershed transformation.

In some implementations, selecting the one or more portions of the rock fragment images can include, for each of the rock fragment images, (i) identifying the image segment corresponding to the rock gain having a largest area among the rock gains in the rock fragment image, and (ii) selecting the identified image segment as one of the one or more portions of the rock fragment images. The area of an image segment can be calculated, for example, by counting the number of pixels that are included in the image segment (for example, the number of pixels that are enclosed by a detected edge).

The one or more processors generate a geological formation image based on the one or more selected portions of the rock fragment images (block 506). The geological formation image is indicative of one or more geological characteristics of the subsurface formation along the well bore. In some implementations, the one or more geological characteristics of the subsurface formation along the well bore can include a porosity of the subsurface formation along the well bore and/or a permeability of the subsurface formation along the well bore.

In some implementations, the plurality of rock fragment images can represent rock fragments obtained from the subsurface formation at a plurality of depths along the well bore. Further, the geological formation image can be indicative of the one or more geological characteristics of the subsurface formation at each of the depths along the well bore. For example, referring to FIG. 1, during a drilling process, the fragments 114 that are excavated may be associated with progressively lower depths beneath the surface of the earth 110. Accordingly, the images 116 of those fragments 114 can be associated with the depths or ranges or depths from which the fragments 114 were obtained. Further, the geological formation image can be indicative of one or more geological characteristics of the subsurface formation at each of those depths.

In some implementations, the plurality of rock fragment images can represent rock fragments obtained from the subsurface formation at a plurality of first depths along the well bore. Further, geological formation image can be indicative of the one or more geological characteristics of the subsurface formation at each of the first depths and at each of a plurality of second depths along the well bore, where the first depths are different from the second depths. For example, one or more portions of the geological formation image be extrapolated or interpolated based on the rock fragment images.

In some implementations, generating the geological formation image can include combining the one more selected portions of the rock fragment images into the geological formation image. Combining the one or more selected portions of the first rock fragment images into the second geological formation image can include arranging the one more selected portions of the first rock fragment images sequentially along a first dimension in the geological formation image.

In some implementations, each of the one or more selected portions of the first rock fragment images can be associated with a respective depth. Further, the one more selected portions of the first rock fragment images can be arranged sequentially in the geological formation image according to depth.

In some implementations, the geological formation image can include multiple instances of at least one of the one or more selected portions of the rock fragment images.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 and image synthesis system 150 can be implemented using digital electronic circuitry, or in computer software, firmware, or hardware, or in combinations of one or more of them. In another example, the process 500 shown in FIG. 5 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 6:
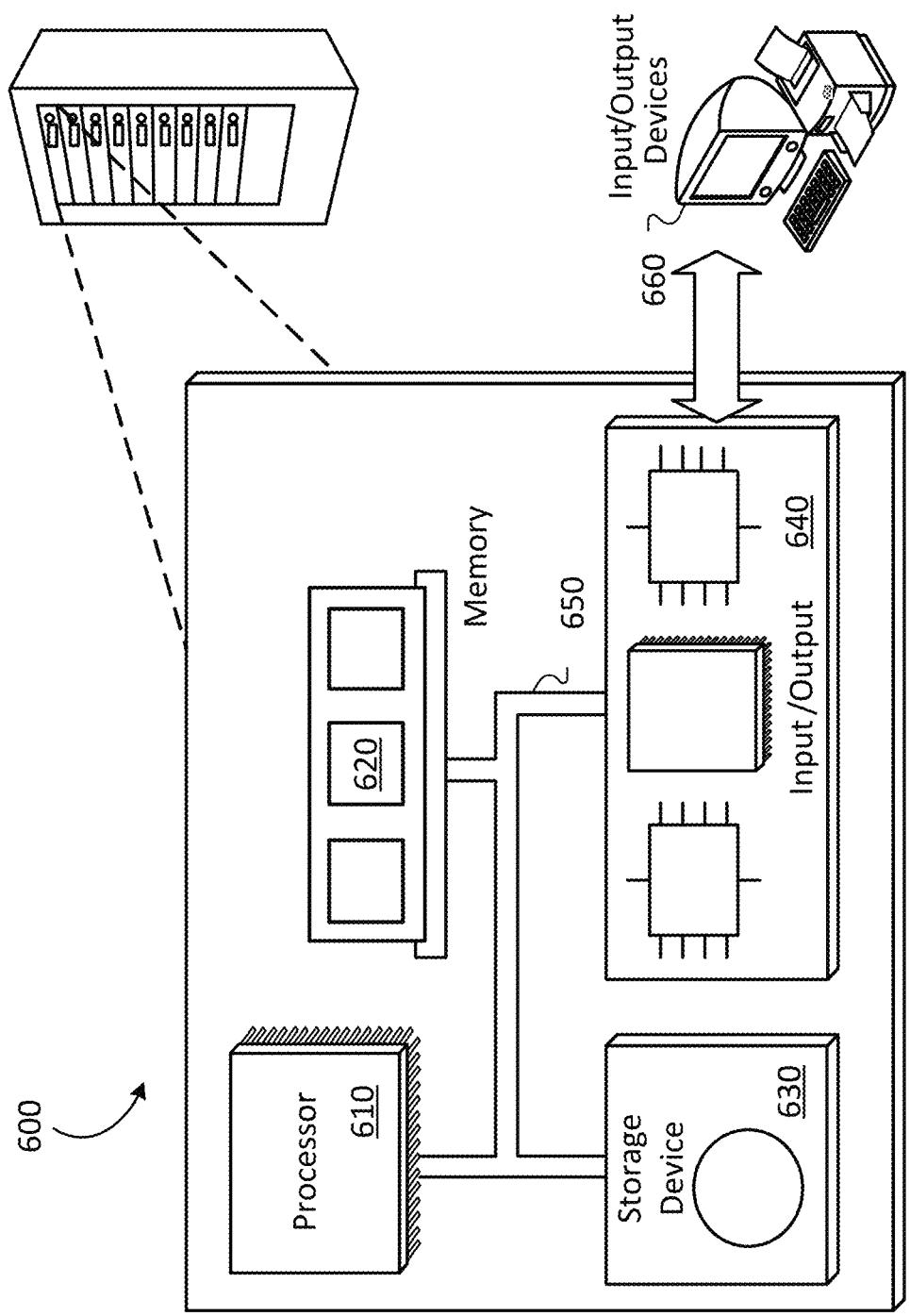
FIG. 6 is a schematic diagram of an example computer system.

FIG. 6 shows an example computer system 600 that includes a processor 610, a memory 620, a storage device 630 and an input/output device 640. Each of the components 610, 620, 630 and 640 can be interconnected, for example, by a system bus 650. In some implementations, the computer system 600 can be used to control the operation of the system 100. For example, the image synthesis system 150 in FIG. 1 can include a computer system 600 to generate one or more synthetic geological formation images based on rock fragment images. The processor 610 is capable of processing instructions for execution within the system 600. In some implementations, the processor 610 is a single-threaded processor, a multi-threaded processor, or another type of processor. The processor 610 is capable of processing instructions stored in the memory 620 or on the storage device 630. The memory 620 and the storage device 630 can store information within the system 600.

The input/output device 640 provides input/output operations for the system 600. In some implementations, the input/output device 640 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 660. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A method comprising:
    receiving, by one or more processors, a plurality of rock fragment images, wherein each of the rock fragment images represents respective rock fragments obtained from a subsurface formation during well bore drilling;
    selecting, by the one or more processors, one or more portions of the rock fragment images; and
    generating, by the one or more processors, a geological formation image based on the one or more selected portions of the rock fragment images, wherein the geological formation image is indicative of one or more geological characteristics of the subsurface formation along the well bore, and wherein the geological formation image is generated by extrapolating at least a portion of the geological formation image based on the one or more selected portions of the rock fragment images,
        wherein generating the geological formation image comprises combining the one more selected portions of the rock fragment images into the geological formation image, and
        wherein the geological formation image comprises:
            a first instance of a first selected portion of the rock fragment image representing the subsurface formation at a first depth, and
            a second instance of the first selected portion of the rock fragment image representing the subsurface formation at a second depth different from the first depth,
            wherein the first instance of the first selected portion of the rock fragment image is identical to the second instance of the first selected portion of the rock fragment image.

2. The method of claim 1, wherein the one or more geological characteristics of the subsurface formation along the well bore comprise at least one of:
    a porosity of the subsurface formation along the well bore, or
    a permeability of the subsurface formation along the well bore.

3. The method of claim 1, wherein the plurality of rock fragment images represent rock fragments obtained from the subsurface formation at a plurality of depths along the well bore, and
    wherein the geological formation image is indicative of the one or more geological characteristics of the subsurface formation at each of the depths along the well bore.

4. The method of claim 1, wherein the plurality of rock fragment images represent rock fragments obtained from the subsurface formation at a plurality of first depths along the well bore, and
    wherein the geological formation image is indicative of the one or more geological characteristics of the subsurface formation at each of the first depths and at each of a plurality of second depths along the well bore, wherein the first depths are different from the second depths.

5. The method of claim 1, wherein selecting the one or more selected portions of the rock fragment images comprises:
    for each of the rock fragment images, segmenting the rock fragment image into a plurality of image segments, wherein each of the image segments corresponds to a different respective rock grain in the rock fragment image.

6. The method of claim 5, wherein segmenting the rock fragment image comprises identifying one or more edges in the rock fragment image.

7. The method of claim 5, wherein segmenting the rock fragment image comprises identifying one or more contiguous regions in the rock fragment image.

8. The method of claim 5, the rock fragment image is segmented based on a watershed transformation.

9. The method of claim 5, wherein selecting the one or more portions of the rock fragment images comprises:
    for each of the rock fragment images:
        identifying the image segment corresponding to the rock gain having a largest area among the rock gains in the rock fragment image, and
        selecting the identified image segment as one of the one or more portions of the rock fragment images.

10. The method of claim 1, wherein generating the geological formation image comprises:
    combining the one more selected portions of the rock fragment images into the geological formation image.

11. The method of claim 10, wherein combining the one or more selected portions of the first rock fragment images into the second geological formation image comprises:

arranging the one more selected portions of the first rock fragment images sequentially along a first dimension in the geological formation image.

12. The method of claim 11, wherein each of the one or more selected portions of the first rock fragment images is associated with a respective depth, and
wherein the one more selected portions of the first rock fragment images are arranged sequentially in the geological formation image according to depth.

13. A system comprising:
one or more processors; and
one or more non-transitory computer readable media storing instructions that, when executed by the one or more processors, cause the one or more processors to perform operations comprising:
receiving a plurality of rock fragment images, wherein each of the rock fragment images represents respective rock fragments obtained from a subsurface formation during well bore drilling;
selecting one or more portions of the rock fragment images; and
generating a geological formation image based on the one or more selected portions of the rock fragment images, wherein the geological formation image is indicative of one or more geological characteristics of the subsurface formation along the well bore, and wherein the geological formation image is generated by at least one of:
interpolating at least a portion of the geological formation image based on the one or more selected portions of the rock fragment images, or
extrapolating at least a portion of the geological formation image based on the one or more selected portions of the rock fragment images, and
wherein generating the geological formation image comprises combining the one more selected portions of the rock fragment images into the geological formation image, and
wherein the geological formation image comprises:
a first instance of a first selected portion of the rock fragment image representing the subsurface formation at a first depth, and
a second instance of the first selected portion of the rock fragment image representing the subsurface formation at a second depth different from the first depth,
wherein the first instance of the first selected portion of the rock fragment image is identical to the second instance of the first selected portion of the rock fragment image.

14. One or more non-transitory computer readable media storing instructions that, when executed by one or more processors, cause the one or more processors to perform operations comprising:
receiving a plurality of rock fragment images, wherein each of the rock fragment images represents respective rock fragments obtained from a subsurface formation during well bore drilling;
selecting one or more portions of the rock fragment images; and
generating a geological formation image based on the one or more selected portions of the rock fragment images, wherein the geological formation image is indicative of one or more geological characteristics of the subsurface formation along the well bore, and wherein the geological formation image is generated by extrapolating at least a portion of the geological formation image based on the one or more selected portions of the rock fragment images,
wherein generating the geological formation image comprises combining the one more selected portions of the rock fragment images into the geological formation image, and
wherein the geological formation image comprises:
a first instance of a first selected portion of the rock fragment image representing the subsurface formation at a first depth, and
a second instance of the first selected portion of the rock fragment image representing the subsurface formation at a second depth different from the first depth,
wherein the first instance of the first selected portion of the rock fragment image is identical to the second instance of the first selected portion of the rock fragment image.

* * * * *